United States Patent [19]

Kepley

[11] Patent Number: 4,813,441

[45] Date of Patent: Mar. 21, 1989

[54] CAMOUFLAGE DEVICE FOR HUNTER'S SEAT

[76] Inventor: Charles F. Kepley, Rte. 3, Box 485, Salisbury, N.C. 28144

[21] Appl. No.: 203,829

[22] Filed: Jun. 8, 1988

[51] Int. Cl.⁴ ............................................. A01M 31/00
[52] U.S. Cl. ...................................... 135/90; 135/120; 135/901; 43/1
[58] Field of Search ................. 135/90, 901, 120, 117; 43/1

[56] References Cited

U.S. PATENT DOCUMENTS 2,816,297  12/1957  Stanley ........................................ 43/1
2,827,729  3/1958  Hoene ......................................... 43/1
3,116,808  1/1964  Riley ........................................ 135/901

Primary Examiner—David A. Scherbel
Assistant Examiner—Caroline D. Dennison
Attorney, Agent, or Firm—W. Thad Adams, III

[57] ABSTRACT

A camouflage device for use with a hunter's seat of the type secured to a tree and comparing an extension member for being secured adjacent one of its ends to the seat with the other of its ends extending outwardly therefrom. A cross member is secured to the outwardly extending end of the extension member and a plurality of brush holders is positioned at intervals along the length of the cross member for holding brush in a substantially upright position in front of the hunter's seat for camouflaging an occupant of the seat.

12 Claims, 2 Drawing Sheets

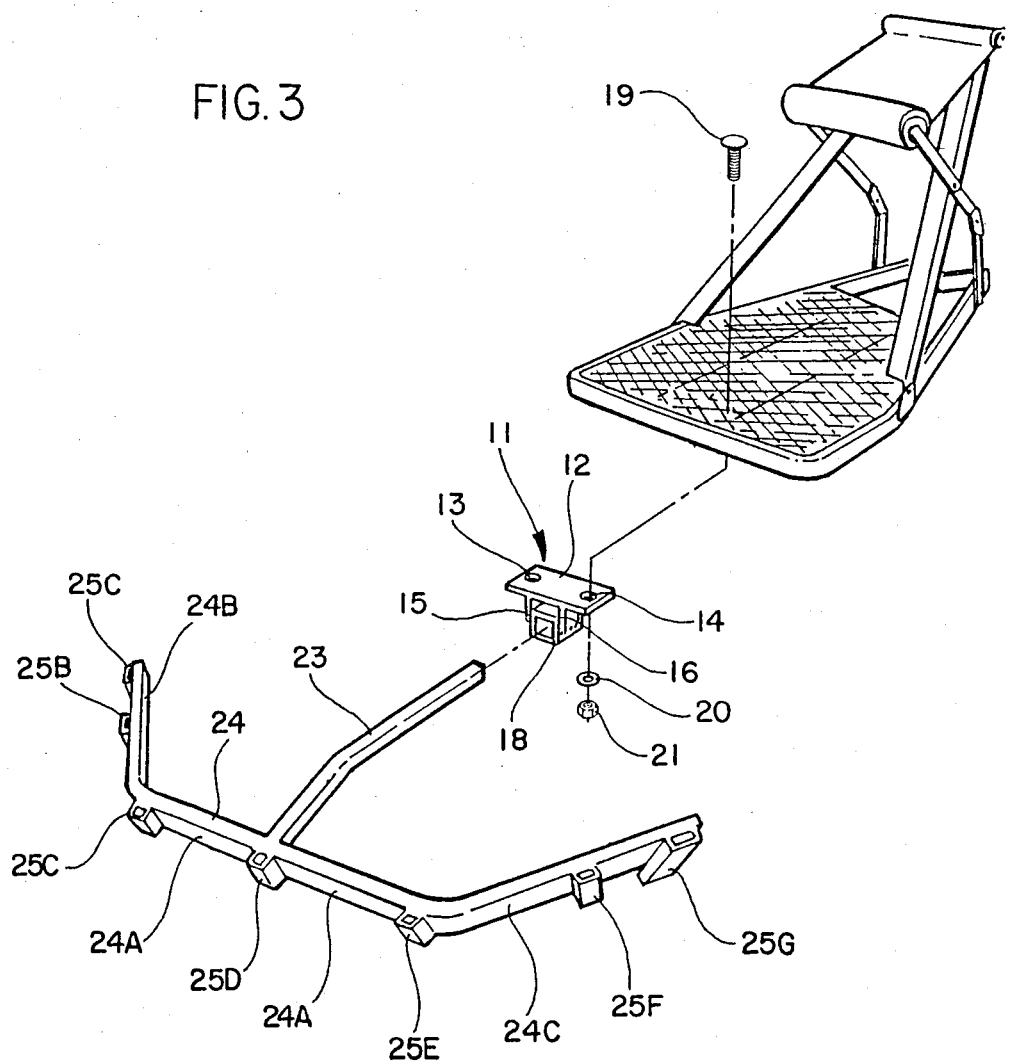

CAMOUFLAGE DEVICE FOR HUNTER'S SEAT

TECHNICAL FIELD AND BACKGROUND OF THE INVENTION

This invention relates to a camouflage device for a hunter'seat. In the embodiment shown in this application, the hunter's seat is one of the type which is collapsible, and which is intended to be suspended from a tree, pole or other tall structure. These seats are manufactured by numerous different companies and vary in many respects but are generally characterized by the provision of a means for suspending the seat from the structure, a seat member and usually a foot rest of some type. The occupant of the seat is typically elevated but nevertheless in clear view.

This type of seat is substantially different from another type of elevated seat which comprises a platform surrounded by a fabric camouflage enclosure which is confining and severely limits vision. This type of seat is also bulky, heavy and difficult to erect since some type of frame is required to hold the fabric camouflage.

SUMMARY OF THE INVENTION

Therefore, it is an object of the invention to provide a camouflage device for use with a hunter's seat of the type typically suspended from a tree or pole.

It is another object of the invention to provide a camouflage device which is lightweight, easy to assemble and disassemble and which can be used with a variety of hunter's seats made by different manufacturers.

It is another object of the invention to provide a camouflage device which makes use of natural brush, scrub and bushes from the immediate area in which the camouflage device is to be used.

It is another object of the invention to provide a camouflage device Which provides excellent cover for the occupant of the seat permitting substantially unrestricted vision through the camouflage in all directions.

It is another object of the invention to provide a camouflage device which enables the user of the seat to use as much or as little camouflaging material as is desired and of the types desired.

These and other objects of the present invention are achieved in the preferred embodiments disclosed below by providing a camouflage device for use with a hunter's seat of the type secured to a tree and comprising an extension member for being secured adjacent one of its ends to the seat with the other of its ends extending outwardly therefrom.

A cross member is secured to the outwardly extending end of the extension member and a plurality of brush holders is positioned at intervals along the length of the cross member for holding brush in a substantially upright position in front of the hunter's seat for camouflaging an occupant of the seat.

According to one preferred embodiment of the invention, the camouflage device includes a bracket for releasably securing the extension member to a foot rest of the hunter's seat.

According to another preferred embodiment of the invention, the cross member includes a center segment substantially normal to the extension member and a pair of angled outer segments on opposite respective ends of the center segment and extending at an acute angle back along at least a portion of the length of the extension member.

According to yet another preferred embodiment of the invention the brush holders comprise tubes and some of the tubes are positioned on the cross member to hold the brush substantially perpendicular with respect to the cross member and wherein some of the tubes are positioned on the cross member to hold the brush non-perpendicularly with respect to the cross member.

According to yet another preferred embodiment of the invention the extension member is bent at some point along its length in such manner as to cause the brush to angle outwardly away from the occupant of the seat.

Preferably, the extension member and the cross member each comprise tubular aluminum or tubular plastic.

BRIEF DESCRIPTION OF THE DRAWINGS

Some of the objects of the invention have been set forth above. Other objects and advantages of the invention will appear as the description of the invention proceeds when taken in conjunction with the following drawings, in which:

FIG. 3 is an exploded view of the camouflage device and showing the method of attachment to the hunter's seat.

DESCRIPTION OF THE PREFERRED EMBODIMENT

Figure 1:
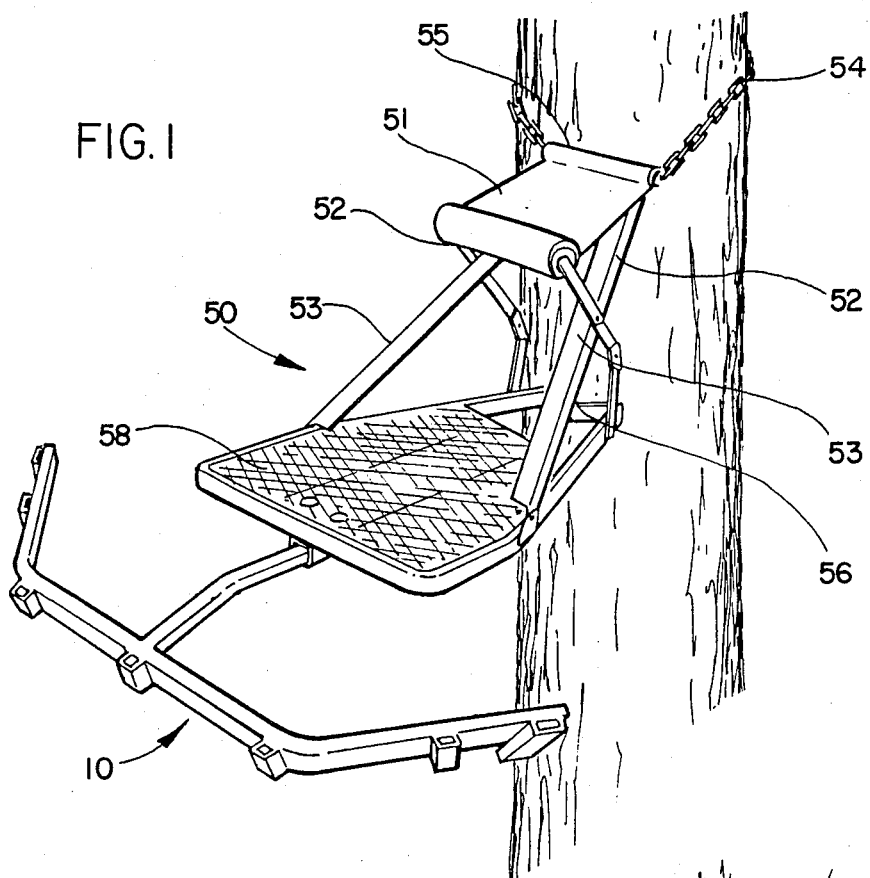
FIG. 1 is a perspective view of the camouflage device in place on a hunter's seat.

Referring now specifically to the drawings, a camouflage device according to the present invention is illustrated in FIG. 1 and shown generally at reference numeral 10 Seat 10 is shown mounted on a hunter's seat 50 which includes a fabric seat member 51 suspended between two pairs of frames 52 and 53. A chain 54 passes through a pocket 55 in seat member 51 and holds the seat 50 at a desired height on the tree. A brace 56 braces the seat 50 against side-to-side movement. A foot rest 58 of expanded metal is secured to frames 52, 53 and brace 56.

Referring now to FIG. 3, camouflage device 10 is attached to seat 50 by a bracket 11 which includes a base plate 12 having a pair of holes 13, 14 and a pair of spaced-apart side plates 15 and 16. A square section of aluminum tubing forms an anchor 18 and is welded to the side plates 15 and 16. Bracket 11 is attached to seat 50 by placing bracket 11 on the underside of the foot rest 58 and passing a pair of bolts 19 (one shown) down through the expanded metal of foot rest 58 and through holes 13, 14 respectively. The bolts 19 are secured with washers 20 and nuts 21 (one of each shown).

The camouflage device 10 includes an extension member 23 formed of aluminum tubing and sized for a press fit into anchor 18. Extension member 23 is welded onto a cross member 24, also formed of aluminum tubing which includes a center segment 24a and two side segments 24b and 24c formed by bending cross member in two places, as is shown in FIG. 3.

Brush holders 25a–25g, inclusive, and formed of short lengths of aluminum tubing are welded onto the front side of cross member 24. The number used is a matter of choice. However the seven brush holders 25a–25g have been found adequate for most purposes. As can be seen in FIG. 3, extension member 28 is bent slightly so when positioned in bracket 11, the brush holders 25a–25g each extend slightly outwardly away from the occupant of the seat 50. In addition, brush holders 25a and 25g are welded to cross member side segments 24b and 24c, respectively, so as to project rearwardly.

Figure 2:
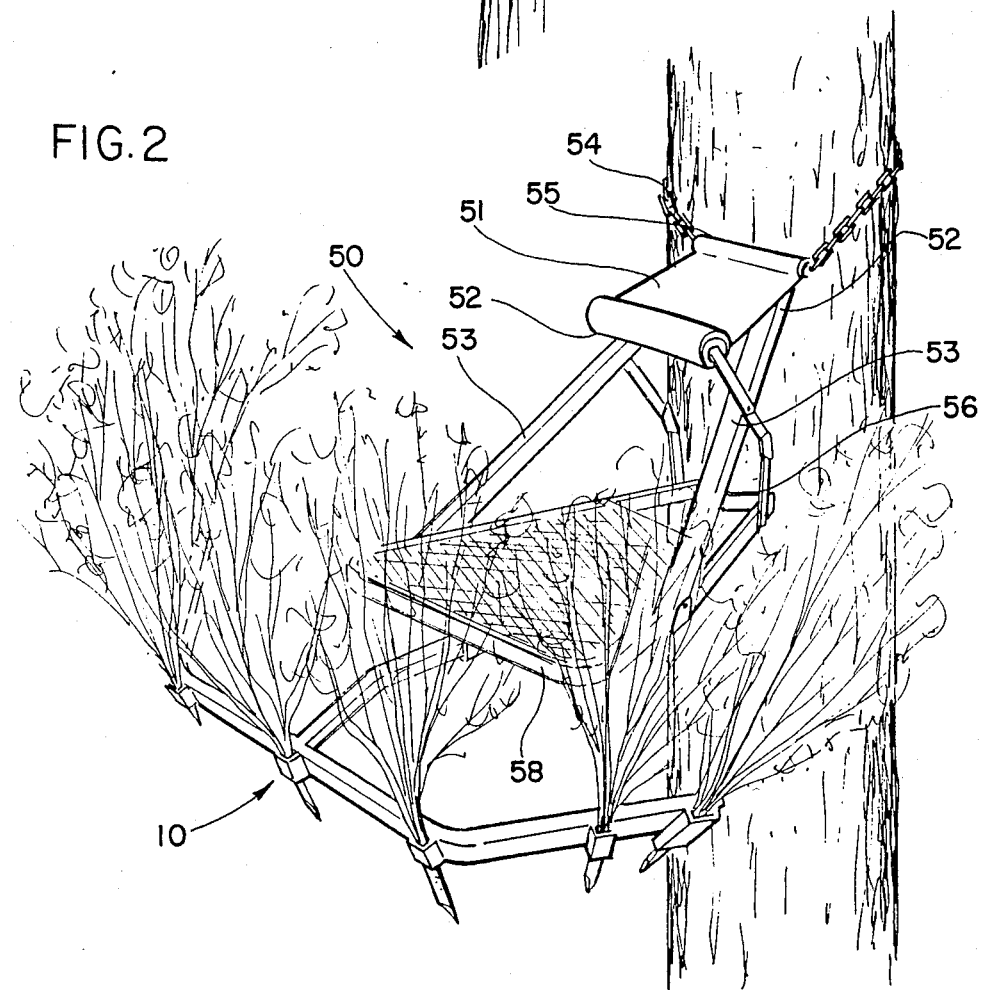
FIG. 2 is a view similar to FIG. 1 with brush positioned in the brush holders.

When properly assembled and installed on seat 50, the camouflage device appears as is shown in FIGS. 1 and 2. As is shown in FIG. 2, brush, including short lengths of limbs, small bushes and the like are inserted in the brush holders 25a-25g. The bend in extension member 23 directs the brush outwardly away from the occupant so that unobstructed handling of weapons is possible. The rearward angle of the side segments 24a and 24c and the rearward angle of brush holders 25a and 25g effectively screen the sides as well as the front of the seat 50.

Use of the camouflage device 10 provides extremely effective camouflage. Since the brush to be used is collected at the site of use, it naturally blends into the environment in a way which any form of camouflage cloth cannot. In addition, as much or as little brush as is considered necessary or desireable can be used based on the preference of the user. Even though the brush provides good cover, it nevertheless provides far better visibility than cloth, where the occupant is usually required to peer through relatively small observation holes through Which a weapon must be extended.

To store and transport the camouflage device 10, the brush is removed from the brush holders 25a-25g, the extension member 23 is removed from bracket I! and reinserted into bracket 11 from the opposite side, so that the extension member 23 and cross member 24 are positioned under and behind foot rest 58.

Of course, camouflage device 10 can be constructed from materials other than aluminum—for example, many of the numerous lightweight polymer plastics such as polypropylene, polystyrene and polyethylene. In addition, the brush holders 25a-25b can be replaced by holes formed directly in the cross member 24. In this embodiment, a cross member having a larger dimension is preferable so that a relatively large hole can be formed while not significantly reducing the strength and weight-bearing capacity of the structure.

A camouflage device is described above. Various details of the invention may be changed without departing from its scope. Furthermore, the foregoing description of the preferred embodiment according to the present invention is provided for the purpose of illustration only and not for the purpose of limitation—the invention being defined by the claims.

I claim:

1. A camouflage device for use with a hunter's seat of the type secured to a tree and comprising:
   (a) an extension member for being secured adjacent one end thereof to said seat with the other end of said extension member extending outwardly therefrom;
   (b) a cross member secured to the outwardly extending end of the extension member; and
   (c) a plurality of brush holders positioned at intervals along the length of said cross member for holding brush in a substantially upright position in front of the hunter's seat for camouflaging an occupant of the seat.

2. A camouflage device according to claim 1, and including a bracket for releasably securing the extension member to a foot rest of the hunter's seat.

3. A camouflage device according to claim 1, wherein said cross member includes a center segment substantially normal to said extension member and a pair of angled outer segments on opposite respective ends of said center segment and extending at an acute angle back along at least a portion of the length of said extension member.

4. A camouflage device according to claim 1, wherein said brush holders comprise tubes.

5. A camouflage device according to claim 4, wherein some of said tubes are positioned on said cross member to hold the brush substantially perpendicular with respect to said cross member and wherein some of said tubes are positioned on said cross member to hold the brush non-perpendicularly with respect to said cross member.

6. A camouflage device according to claim 1, wherein said extension member is bent at some point along its length in such manner as to cause the brush to angle outwardly away from the occupant of the seat.

7. A camouflage device according to claim 1, wherein said extension member and said cross member each comprise tubular aluminum.

8. A camouflage device according to claim 1, wherein said extension member and said cross member each comprise tubular plastic.

9. A camouflage device for use with a hunter's seat of the type secured to a tree and comprising:
   (a) an extension member for being secured adjacent on end thereof to said seat with the other end thereof extending outwardly therefrom, said extension member being bent at some point along its length in such manner as to cause the brush to angle outwardly away from the occupant of the seat;
   (b) a cross member secured to the outwardly extending end of the extension member, said cross member including center segment substantially normal to said extension member and a pair of angled outer segments on opposite respective ends of said center segment and extending at an acute angle back along at least a portion of the length of said extension member; and
   (c) a plurality of brush holders positioned at intervals along the length of said cross member for holding brush in a substantially upright position in front of the hunter's seat for camouflaging an occupant of the seat, said brush holders comprising tube, wherein some of said tubes are positioned on said cross member to hold the brush substantially perpendicular with respect to said cross member and wherein some of said tubes are positioned on said cross member to hold the brush non-perpendicularly with respect to said cross member.

10. A camouflage device according to claim 9, wherein said extension member is bent at some point along its length in such manner as to cause the brush to angle outwardly away from the occupant of the seat.

11. A camouflage device according to claim 9, wherein said extension member and said cross member each comprise tubular aluminum.

12. A camouflage device according to claim 9, wherein said extension member and said cross member each comprise tubular plastic.

* * * * *